United States Patent [19]

Schröter

[11] 4,149,433
[45] Apr. 17, 1979

[54] VARIABLE RATIO BRAKE OPERATING DEVICE

[76] Inventor: Hans O. Schröter, Robert-Koch-Str., 18, Munich 22, Fed. Rep. of Germany

[21] Appl. No.: 824,744

[22] Filed: Aug. 15, 1977

[30] Foreign Application Priority Data

Oct. 12, 1976 [DE] Fed. Rep. of Germany ....... 2645982

[51] Int. Cl.² .............................................. G05G 1/04
[52] U.S. Cl. ........................................ 74/516; 74/518
[58] Field of Search .................................. 74/516, 518

[56] References Cited

U.S. PATENT DOCUMENTS

| 3,216,276 | 11/1965 | Nagy | 74/516 |
| 3,719,106 | 3/1973 | Schröter | 74/518 |
| 3,934,490 | 1/1976 | Schröter | 74/516 X |
| 3,938,407 | 2/1976 | Nisbet | 74/516 |
| 3,939,727 | 2/1976 | Asquith | 74/516 |

Primary Examiner—Leonard H. Gerin
Attorney, Agent, or Firm—Edmund M. Jaskiewicz

[57] ABSTRACT

The invention provides a brake operating device wherein an operating lever pivoted on a frame transmits an applied force with a variable ratio through a roller and cam-lever mechanism to the brake linkage. A two-armed cam lever is pivoted on the frame and has one arm connected to the brake linkage and on its other arm there is provided a cam track upon which is guided a roller rotatably mounted on the operating lever. There is a recess in the cam lever in the vicinity of its pivot mount and this recess has an approximately semi-circular configuration to receive the roller when the operating lever is in its release position. The cam track on the cam lever is disposed between the pivot mount of the operating lever and the pivot mount of the roller on the operating lever.

9 Claims, 5 Drawing Figures

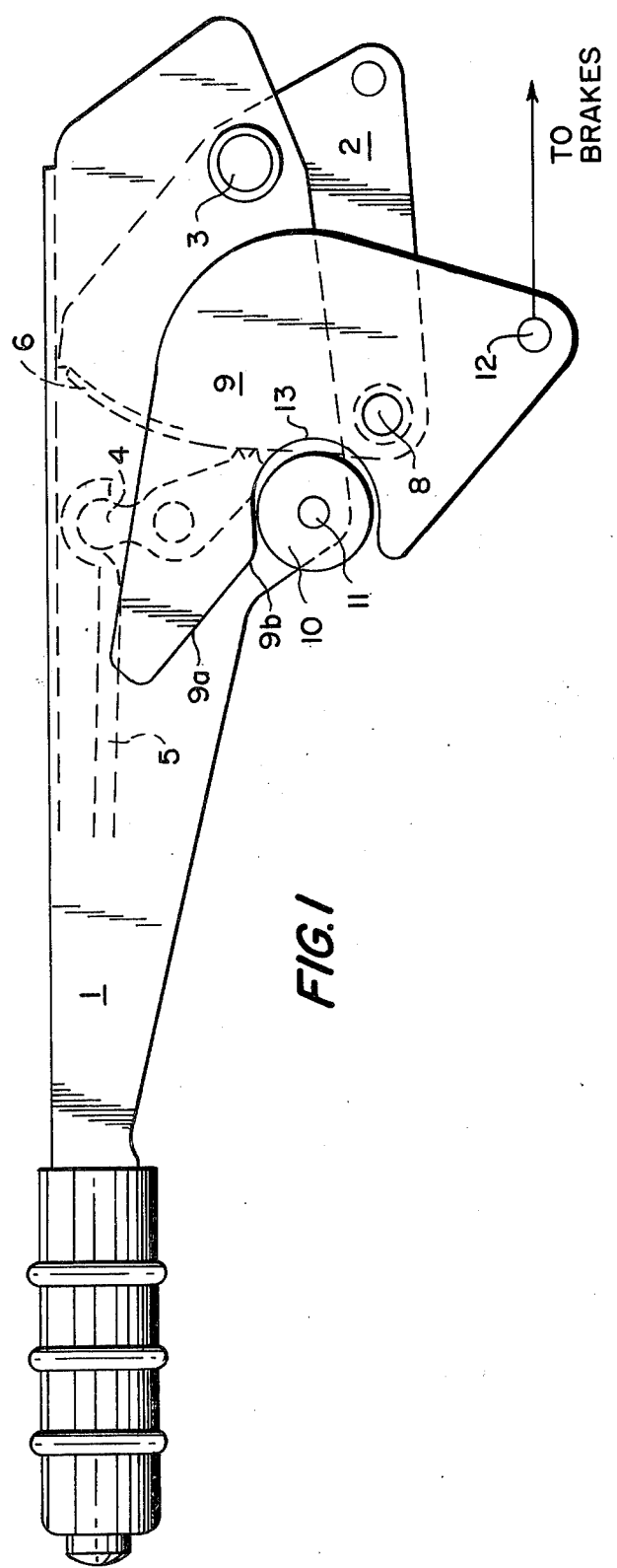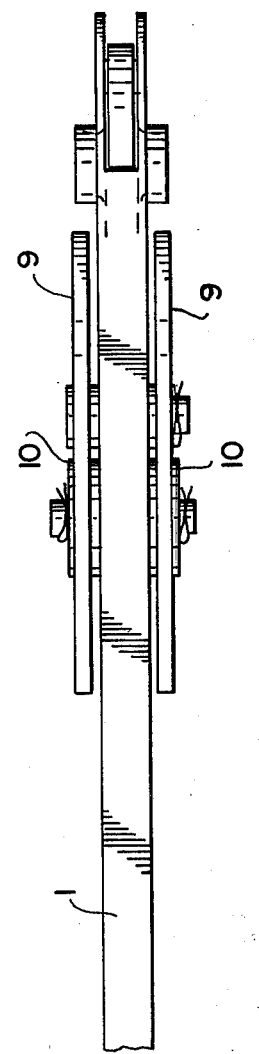

VARIABLE RATIO BRAKE OPERATING DEVICE

The present invention relates to a variable ratio brake operating device, more particularly, to such a device wherein operating force is transmitted through a roller and cam lever mechanism to the brake linkage.

Many different structures of variable ratio operating devices particularly for the brake linkage system for vehicles have been provided which vary the ratio between the velocity with which the operating lever is pivoted from its release position to the velocity of the movement of an actuating element, and accordingly the brake linkage. A variation of this ratio is generally obtained by providing a suitable structure for decreasing the distance of the actuating element from the operating lever pivot mount as the operating lever is pivoted from its release position in the braking direction. Such operating devices are advantageous since they provide for a more effective use of the actuating force derived from the pivotable movement of the operating lever as result of the increase of the force transmission ratio between the release and braking positions of the operating lever. Such operating devices quickly overcome any slack or play in the brake linkage system during the initial pivoting movement of the operating lever from its released position through only a short distance.

Various forms of rollers and cam lever mechanisms have been employed in such brake operating devices in order to vary the force transmission ratio. A disadvantage of existing roller and cam lever mechanisms in such brake operating devices is that the operating device was rather bulky and occupied rather large space. Since the construction of motor vehicles at the present time provides only a minimum of space for various operating components the use of such cam lever brake operating devices has not been particularly satisfactory. While such cam lever brake operating devices did provide for a satisfactory amplification of the ratio, the space required by the devices to perform their variable ratio operation was relatively large so as to preclude the use of such devices except for relatively limited conditions.

It is therefore the principal object of the present invention to provide a novel and improved variable ratio brake operating device utilizing a roller and cam lever mechanisms to transmit actuating force to the brake linkage.

It is another object of the present invention to provide such a brake operating device which provides the largest possible amplification of the operating force but which occupies a minimum of space.

According to one aspect of the present invention a variable ratio brake operating device may comprise an operating lever pivotally mounted on a frame member. A cam lever having first and second arms is pivotally mounted on the frame member such that the first arm is connected to the brake mechanism and the second arm has a cam track thereon. A roller rotatably mounted on the operating lever is guided along the cam track as the operating lever is pivoted from its release position in the braking direction. There is a recess on the cam lever in the vicinity of its pivot mount to receive the roller when the operating lever is in the release position. The cam track is positioned between the pivot mount of the roller and the operating lever pivot mount on the frame member.

This mounting of the cam lever guide track for the roller and the provision of a recess in which the roller is seated during the release position of the operating lever results in the largest possible amplification of operating force while requiring the smallest space for the operating device. "Amplification" with respect to the brake operating device refers to the quotient obtained by dividing the maximum force transmission ratio by the ratio of the distance traveled by the brake operating lever from the initial application of braking force until full braking is achieved with respect to the distance traveled by the brake linkage. By employing the disclosed structures and structural relationships the resulting brake operating device will require a very small space. This space will be not much larger than the case of a simple operating lever for a brake operating device. With the present invention an amplification ratio of as high as 3:1 can be obtained. In addition, the rollers are only moderately stressed as result of a relatively long travel distance of the rollers on the cam lever.

Other objects and advantages of the present invention will be apparent upon reference to the accompanying description when taken in conjunction with the following drawings, which are exemplary, wherein;

FIG. 1 is a side elevational view of the brake operating device according to the present invention in the release position;

FIG. 2 is a top plan view of the operating device of FIG. 1;

Proceeding next to the drawings wherein like reference symbols indicate the same parts throughout the various views a specific embodiment and modifications of the present invention will be described in detail.

Figure 3:
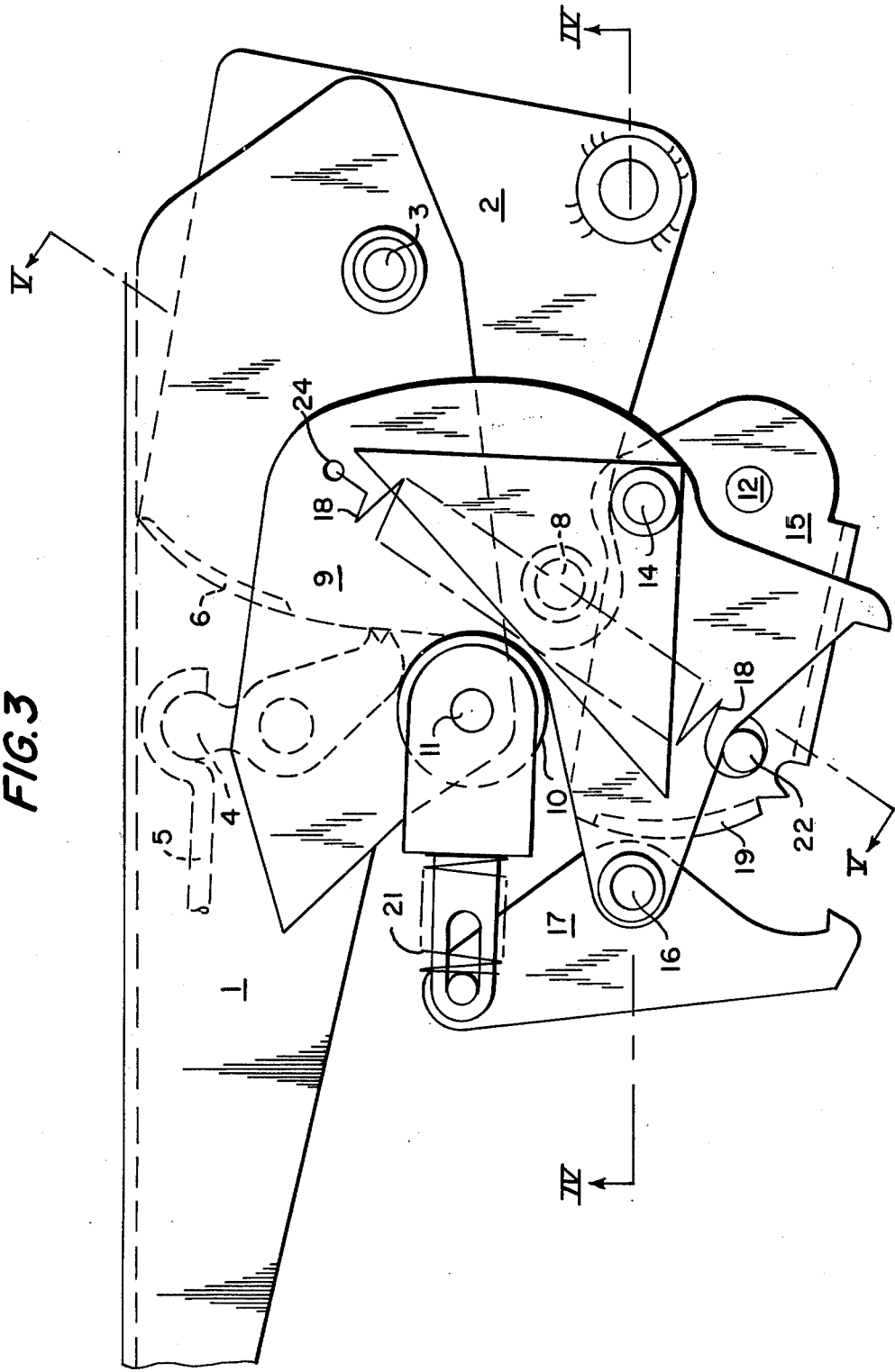
FIG. 3 is a side elevational view of a portion of a modification of a brake operating device according to the present invention.

The brake operating device as illustrated in FIGS. 1 and 2 comprises a manually actuated operating lever 1 which has a U-shaped cross section and is pivotally mounted at 3 on a segment 2 which is attached to the frame. The operating lever 1 can be retained in a selected position by means of a locking lever 4 the end of which is engagable with an arcuate toothed portion 6 formed along an edge of the segment 2. The locking lever 4 is actuated by connecting linkage 5 which may be moved to the right as viewed in FIG. 1 by depression of the release button 7 located in the handle of the operating lever 1 to disengage lever 4 from teeth 6. A prestressed compression spring, which is not shown, is located in the handle of the operating lever to urge the linkage 5 in a direction to engage the locking lever 4 with the teeth 6.

The frame member segment 2 is positioned between the two legs of the U-shaped cross section of operating lever 1 and is provided with a pivot 8 upon which are pivotally mounted two cam levers 9 positioned on both sides of the operating lever 1 as shown in FIG. 2. The cam levers 9 are acted upon by two rollers 10 that are rotatably mounted at 11 on both sides of the operating lever 1.

The cam levers 9 are each provided with two arms and one arm is connected at 12 to an actuating member which may be in the form of a linkage or cable leading to the brake mechanism and not shown in the drawings. On an edge of the other arm there is formed a cam track 9a which is acted upon by the roller 10 to transmit an actuating force from the operating lever 1 through the rollers' 10 to the cam levers 9. The cam track 9a is located so as to extend between pivot 3 of operating lever 1 and pivot pin 11 of the roller 10.

The cam levers are each provided with a recess 13 in the vicinity of their pivots 8 and these recesses have an approximately semi-circular outline or configuration so as to define grooves in which the roller 10 are seated when the operating lever 1 is in its release position as shown in FIG. 1.

In the release position, the ratio of the distance through which the operating lever is pivoted to the distance over which the cam lever 9 is pivoted is small and is at its minimum value. As the operating lever moves in a clockwise direction toward the braking direction the rollers 10 will move upwardly along the recesses 13 to the apex of the cam track indicated at 9b. During this movement of the rollers, the distance ratio will increase to a maximum which is attained at the apex 9b of the cam track. The remaining portion of the cam track 9a may be shaped so as to maintain this ratio constant throughout the last portion of the pivoting of the operating lever 1. If desired, the cam track 9a may be shaped for a decrease of this ratio during the last portion of pivoting movement of the operating lever.

When the operating lever 1 is pivoted in the counterclockwise direction toward the release position to release the brakes, the cam levers 9 will be positively pivoted back into their initial positions by the seating of the rollers 10 in the recesses 13. Thus, the cam levers 9 will be returned to their initial position even if no restoring forces are effective at connection 12. The positive return of the cam levers 9 to their release positions prevents any possibility of the wheel brakes being still applied even to a slight extent when the operating lever is being returned to its release position. Such an unintentional application of the wheel brakes may occur where there is high friction in the transmission elements leading to the brake mechanism.

The use of two rollers mounted on both sides of the operating lever so that the rollers are effectively engagable with cam levers mounted laterally on both sides of the frame segment results in a symmetrical stressing of the operating lever while at the same time provides for a moderate stressing of the rollers. Further, by mounting the operating lever 1 on a segment 2 which in turn is attached to a support or frame results in a simplified structure utilizing a minimum of components and occupying a minimum of space.

Figure 4:
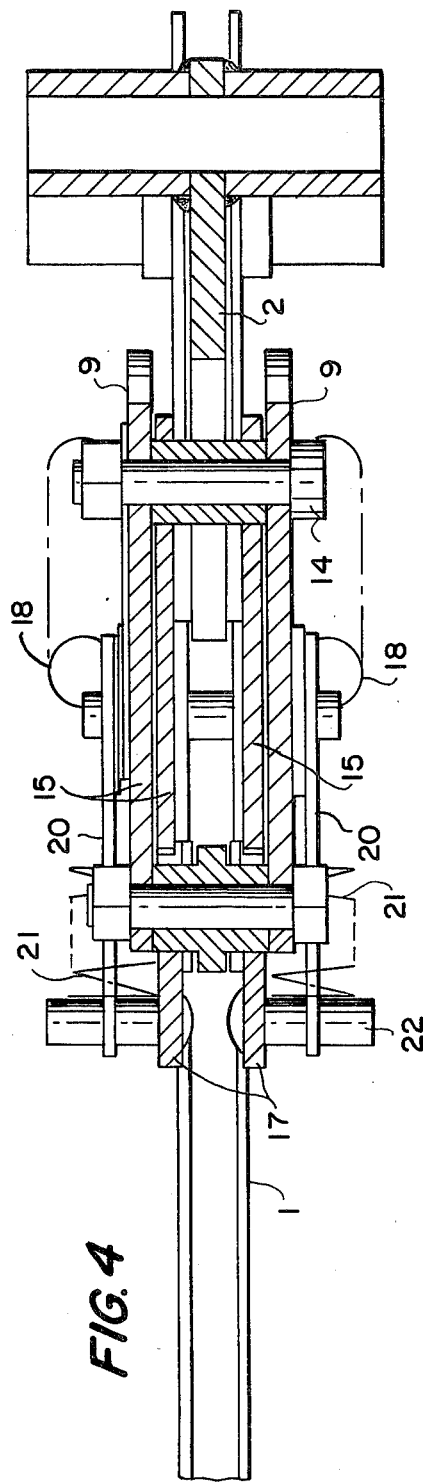
FIG. 4 is a sectional view taken along the line IV—IV of FIG. 3.
Figure 5:
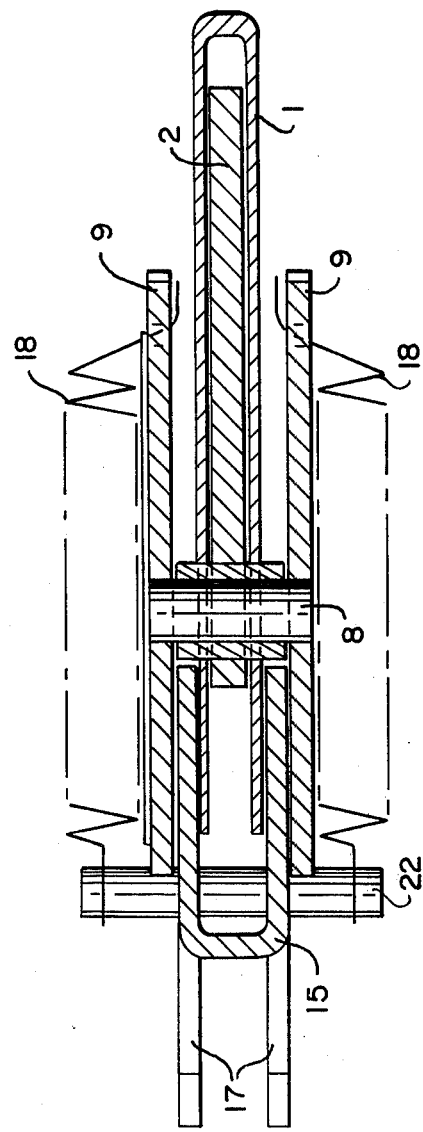
FIG. 5 is a sectional view taken along the line V—V of FIG. 3.

In the modification illustrated in FIGS. 3-5, the brake linkage is connected to the cam levers 9 through an additional lever 15 which is pivotally mounted to the cam levers 9 by a pin 14. The lever 15 is provided with a pin 22 which extends laterally on both sides thereof. Two pretensioned springs 18 have their ends connected to the pin 22 and their other ends connected in a suitable manner at 24 on both of the cam levers 9. Two ratchet levers 17 are pivoted on cam levers 9 at pivot mount 16 and are connected to the respective pivot mounts 11 of rollers 10 by a resilient compression connecting element 20 each having a compression spring 21 therein.

When the operating lever 1 of the modification of FIGS. 3-5 is pivoted in the braking direction, ratchet levers 17 will be brought into engagement with a series of teeth 19 formed on an arcuate portion of the additional lever 15. This action will bring about the variation in ratio which depends on the path of the rollers 10 on the cam levers 9 with respect to the distance traveled by the brake linkage as a function of the operating force applied at 12. In this manner, any play or clearance in the brake mechanism is quickly overcome at the lower ratio existing at the beginning of the pivoting movement of the operating lever from its release position. In this respect, it is pointed out that the embodiment of FIGS. 1 and 2 will overcome larger values in play or clearance but at a higher ratio. As result, the modification of FIGS. 3-5 makes it possible to significantly decrease the operating distance through which the operating lever 1 is pivoted, thus providing the possibility of a considerable increase in the maximum ratio without any additional pivoting distance at the beginning of the braking operating. Thus, with the same pivoting distance of operating lever 1 it is possible to obtain a correspondingly higher maximum ratio and at the same time a greater amplification with respect to the structure of FIGS. 1 and 2.

The use of the compression resilient connectng element 20 provides a simple yet effective structure for bringing the ratchet lever 17 into engagement with the additional lever 19 and at the same time provides sufficient spring force to bring about a reliable and secure coupling between the additional lever 15 and the cam levers 9.

The additional lever 15 may be made with a U-shaped cross section with its legs being positioned between the cam levers 9. The toothed portion 19 is then provided on the edge of both of the legs of additional lever 15 so that a single ratchet lever 17 is operatively associated with a leg of the additional lever. Further, the ratchets are so positioned with respect to the respective legs of additional lever 15 that at least one ratchet lever is fully locked at all times during the braking operation. This prevents any skipping or missing of a coupling between the ratchet levers and the additional lever. Should a ratchet lever engage a point of a tooth on the additional lever and then slide off, the second ratchet lever will attain reliable and secure engagement with the toothed portion. In addition, this arrangement substantially halves the tooth pitch on the additional lever which is significant in adapting the variation in ratio to the force applied to the brake linkage.

The pin 22 acts as an abutment between additional lever 17 and cam levers 9 and the springs 18 urge the additional lever 15 into contact with the cam levers. 9.

It will be understood that this invention is susceptible to modification in order to adapt it to different usages and conditions, and accordingly, it is desired to comprehend such modifications within this invention as may fall within the scope of the appended claim.

What is claimed is:

1. A variable ratio brake operating device comprising a frame member, an operating lever pivotally mounted on said frame member and having a release position, a roller rotatably mounted on said operating lever, a cam lever having first and second arms pivotally mounted on said frame member, said first arm being connected to a brake mechanism and said second arm having a cam track thereon to guide said roller as the operating lever is pivoted from the release position, there being a recess on said cam lever in the vicinity of the cam lever pivot mount receiving said roller when the operating lever is in the release position, said cam track being between the pivot mount of said roller and the operating lever pivot mount on said frame member.

2. A variable ratio brake operating device as claimed in claim 1 wherein said recess comprises a groove.

3. A variable ratio brake operating device as claimed in claim 1 wherein said recess has a semi-circular configuration.

4. A variable ratio brake operating device as claimed in claim 1 wherein said frame member comprises a toothed segment and said operating and cam levers are pivotally mounted on said toothed segment, and means on said operating lever engagable with said toothed segment for retaining said operating lever in a selected position.

5. A variable ratio brake operating device as claimed in claim 4 wherein said operating lever has a pair of rollers mounted on opposed sides thereof, there being a pair of cam levers on opposed sides of said toothed segment and engageable with said rollers.

6. A variable ratio brake operating device as claimed in claim 1 and an additional lever having a toothed portion pivotally mounted on said cam lever first arm and connected to a braking mechanism, spring means urging said additional lever against said cam lever, a ratchet lever pivotally mounted on said cam lever, and second spring means urging said ratchet lever into engagement with said toothed portion of the additional lever.

7. A variable ratio brake operating device as claimed in claim 6 and further comprising a resilient compression element connected said ratchet lever to the roller pivot mount.

8. A variable ratio brake operating device as claimed in claim 6 wherein said operating lever has a pair of rollers mounted on opposed sides thereof, there being a pair of cam levers on opposed sides of said segment and engagable with said rollers, said additional lever having a U-shaped cross section to define a pair of legs, said legs being disposed between said cam levers, each leg having a toothed portion thereon engagable by at least one ratchet lever at any one time.

9. A variable ratio brake operating device as claimed in claim 6 and further comprising a pin on said additional lever engagable by a cam lever, said first spring means being connected between said pin and said cam lever to urge said pin to abut said cam lever.

* * * * *